3 APPARATUS.
Search
March 24, 1936. H. F. SMITH Re. 19,901
REFRIGERATING AND AIR CONDITIONING APPARATUS Orig. 1,883,024
Original Filed Nov. 29, 1930
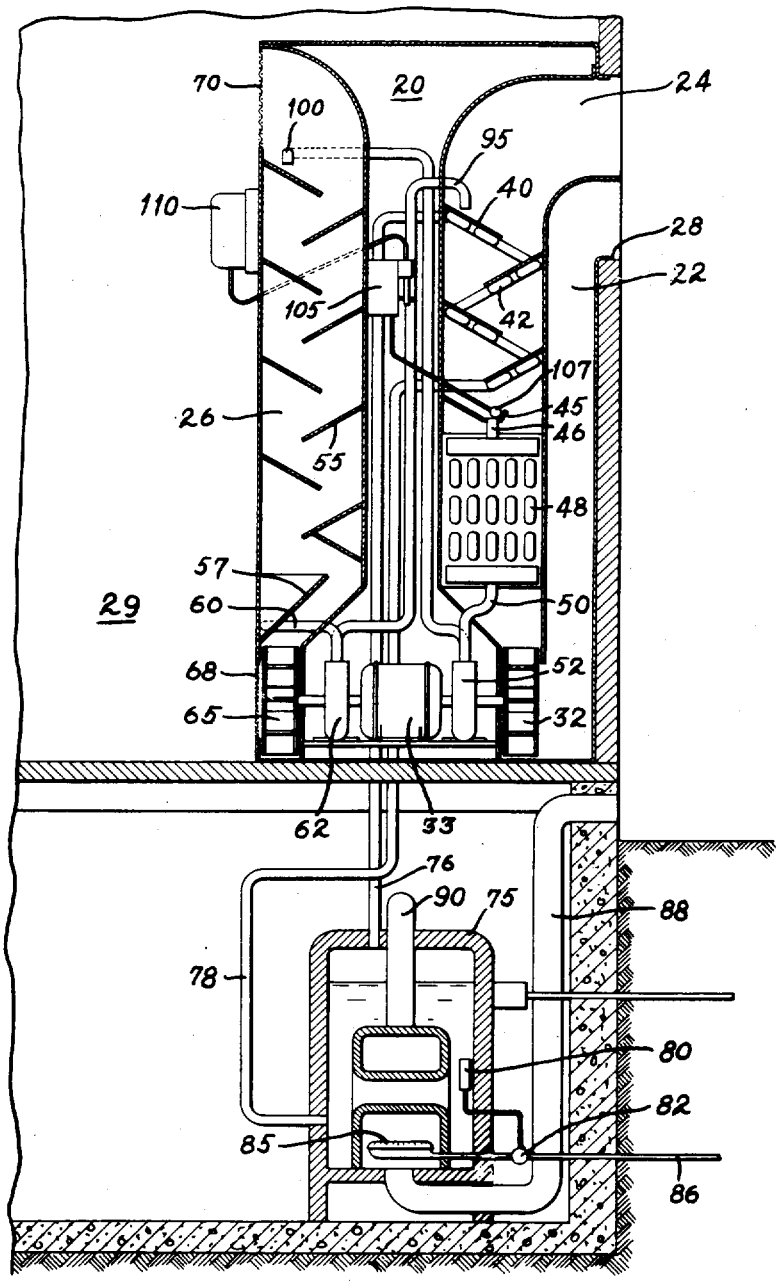
Harry F. Smith INVENTOR
BY
Spencer, Hardman and Fehr
ATTORNEY Reissued Mar. 24, 1936 Re. 19,901

UNITED STATES PATENT OFFICE 19,901

REFRIGERATING AND AIR CONDITIONING APPARATUS

Harry F. Smith, Dayton, Ohio, assignor, by mesne assignments, to General Motors Corporation, a corporation of Delaware Original No. 1,883,024, dated October 18, 1932, Serial No. 499,026, November 29, 1930. Application for reissue December 30, 1933, Serial No. 704,698

17 Claims. (Cl. 261—3)

This invention relates to refrigerating apparatus and more particularly to an apparatus for conditioning air in rooms.

One of the objects of this invention is to provide for the automatic reduction of relative humidity in rooms.

Another object is to provide an apparatus capable of carrying out the foregoing object, which apparatus is portable and which is adapted to be placed adjacent a window or other opening leading to the outside atmosphere for utilizing air outside of the building as an aid in concentrating the means employed for treating the air in the room to thus maintain the air in the room at the proper relative humidity.

Another object of this invention is to provide a portable apparatus which may be placed in a room or the like, which apparatus is adapted to condition the air for the room by removing moisture from the air and which is capable of discharging the moisture thus removed outside of the room without the necessity of drain pipes or the like.

Further objects and advantages of the present invention will be apparent from the following description, reference being had to the accompanying drawing, wherein a preferred form of the present invention is clearly shown.

In the drawing:

The figure in the drawing is a diagrammatic illustration of the invention.

An apparatus embodying features of this invention comprises an air conditioning device designated in general by the numeral 20. The device 20 comprises, in general, an intake flue 22, discharge flue 24 and an air treating zone or flue 26. The device 20 is adapted to be placed adjacent a window or opening 28 with the intake and discharge flue communicating with the outside atmosphere. The device 20 is adapted to treat the air in rooms, and for example, as shown in the drawing the room 29. The device 20 is provided with a fan 32 operated by an electric motor 33, which fan circulates air from the exterior of the room or building through the intake and discharge flues 22 and 24 respectively. The air passing through the discharge flue together with other means about to be described are adapted to condition a liquid absorbing or hygroscopic agent to thus place the absorbing agent in its proper degree of concentration. It is then circulated through the air treating zone 26 to reduce the relative humidity in the room 29 to a desirable condition, all of which takes place in a manner more fully hereinafter described.

That is, the stream of air for the room to be conditioned passes through the flue or compartment 26 where means for removing moisture from the air are provided. This means, in the particular form illustrated includes devices for the flow of a circulated medium whereby the moisture is removed from the air. The circulated medium is then taken into a second flue or compartment below 24 where the circulated medium is prepared or regenerated for reuse in the first compartment 26. This also provides a means for discharging the moisture removed from the air in compartment 26 to the outside of the room through the window means 28. This moisture is discharged in the form of water vapor carried by the air leaving through discharge flue 24.

Referring in detail to the drawing the flue 24 is provided with a plurality of downwardly sloping overlapping baffles 40 having a plurality of interconnected steam pipes 42 secured to the underside of each baffle. The lowermost baffle 40 is provided with a trough 45 having a pipe 46 leading to a coiled solution cooler 48 adapted to be cooled by air circulated by the fan 32. The cooler 48 is connected by pipe 50 to a pump 52 adapted to be actuated by the motor 33. The flue 26 is provided with a plurality of downwardly sloping overlapping baffles 55, and a trough 57 located below the lowermost baffle 55. The trough 57 is provided with a pipe 60 leading to a pump 62 which is adapted to be actuated by motor 33. The flue 26 is also provided with a fan 65 actuated by motor 33 for circulating a stream of air about the room 29 and into and out of the air treating zone 26, the air entering the zone through a screened opening 68 and being discharged adjacent the top of the device 20 through a screened opening 70.

The steam coils 42 are adapted to be supplied by a heater or steam boiler 75 through a supply pipe 76 and a return pipe 78. Obviously, the heater or steam boiler 75 may provide either steam or hot water as desired, it being understood that when steam is mentioned specifically it may be ordinarily replaced by hot water. The temperature in the heater or boiler 75 is preferably maintained constant by providing a thermostat 80 which controls the action of the valve 82 which controls the combustion in the burner 85. The burner 85 may be a gas burner and may be thus supplied with gas through a pipe 86. Air for the combustion of the burner 85 is preferably provided by means of an air duct 88 which is connected to the outside of the building, while the products of combustion are carried away by means of a pipe 90 to a suitable chimney also leading to the outside of the building. Preferably the heater 75 is located in the basement of the building. The supply and return pipes connected to the boiler may be laid to as many rooms as is desired to condition the air therein. Thus it will be noted that the device 20 is of the portable type and may be moved from room to room as desired by simply connecting the steam supply and return pipes therewith.

The operation of the device is as follows: The liquid absorbing or hygroscopic agent, which may be a solution of calcium chloride, a lithium halide, such as lithium chloride, bromide or iodide, also glycerine or the like, is delivered to the discharge flue 24 by means of pump 62 through a pipe 95. The liquid discharged by pipe 95 flows down the steam heated baffles 40 and into the trough 45 whence it passes through the condenser 48 and into the pump 52. The liquid in passing over the steam heated baffles will have the excess moisture evaporated therefrom and while passing through the cooler, which is cooled by a stream of air from the outside atmosphere, will be cooled substantially to the temperature of the outside atmosphere. This circulation of the liquid absorbing agent through the discharge flue will impart thereto a predetermined degree of concentration. The concentrated liquid is then circulated to the air treating zone 26 by means of pumps 52 through a pipe 100. The liquid discharged by pipe 100 flows downwardly over the baffles 55 where it contacts with the circulating room air, thereby dehydrating the air and supplying the treated air to the room at a reduced relative humidity. The liquid absorbing agent is then returned to pump 62 through trough 57 and pipe 60.

In order to control the amount of steam passing through the coils 42 I have provided a steam valve 105 adapted to be controlled by a thermostat 107 responsive to the temperature of the liquid received in the trough 45. This arrangement insures a predetermined degree of concentration of the liquid irrespective of outside air temperature, if a sufficient time is provided for the evaporation at the temperature determined by the thermostat 107.

If desired, a room temperature responsive switch 110 may be provided. The switch 110 is adapted to control the steam valve 105 and stop the motor 33 when the temperature in the room 29 attains a predetermined low point by reason of natural temperature changes in the atmosphere. The switch 110 may also be provided with a manual control for stopping the operation of the device when desired.

While the form of embodiment of the invention as herein disclosed, constitutes a preferred form, it is to be understood that other forms might be adopted, all coming within the scope of the claims which follow.

What is claimed is as follows:

1. An apparatus for conditioning air in a room comprising an intake flue, a discharge flue communicating with said intake flue, said flues communicating with the atmosphere outside said room, means for circulating a hygroscopic liquid through said discharge flue, means in said discharge flue for imparting to said liquid a predetermined degree of concentration at substantially atmospheric temperature, said latter means comprising a steam conduit and means for cooling the liquid, an air treating zone for the air in the room, means for circulating the air in said room through said zone and means for contacting the concentrated liquid with said circulating air in said treating zone.

2. An apparatus for conditioning air in a room comprising an intake flue, a discharge flue communicating with said intake flue, said flues communicating with the atmosphere outside said room, means for circulating a hygroscopic liquid through said discharge flue, means in said discharge flue for imparting to said liquid a predetermined degree of concentration at substantially atmospheric temperature, said latter means comprising a steam conduit and an air cooled condenser for cooling the liquid, an air treating zone for the air in the room, means for circulating the air in said room through said zone and means for contacting the concentrated liquid with said circulating air in said treating zone.

3. An apparatus for conditioning air in a room comprising an intake flue, a discharge flue communicating with said intake flue, said flues communicating with the atmosphere outside said room, means for circulating a hygroscopic liquid through said discharge flue, means in said discharge flue for imparting to said liquid a predetermined degree of concentration at substantially atmospheric temperature, said latter means comprising a steam conduit and means for cooling the liquid, means for controlling the amount of steam passing through said conduit, an air treating zone for the air in the room, means for circulating the air in said room through said zone and means for contacting the concentrated liquid with said circulating air in said treating zone.

4. An apparatus for conditioning air in a room comprising an intake flue, a discharge flue communicating with said intake flue, said flues communicating with the atmosphere outside said room, said discharge flue being provided with a plurality of downwardly sloping overlapping baffles, means for circulating a hygroscopic liquid through said discharge flue, means in said discharge flue for imparting to said liquid a predetermined degree of concentration, said latter means comprising a plurality of interconnected steam coils secured to the underside of each of said baffles and an air cooled coiled condenser adapted to receive the liquid from said baffles, an air treating zone for the air in the room, means for circulating the air in said room through said zone, and means for contacting the concentrated liquid with said circulating air in said treating zone.

5. An apparatus for conditioning air in a room comprising an intake flue, a discharge flue communicating with said intake flue, said flues communicating with the atmosphere outside said room, a fan for circulating air through said flues, a motor for operating said fan, a pump operated by said motor for circulating a hygroscopic liquid through said discharge flue, means in said discharge flue for imparting to said liquid a predetermined degree of concentration at substantially atmospheric temperature, an air treating zone for the air in the room, a fan actuated by said motor for circulating the air in said room through said zone, a pump actuated by said motor for delivering the liquid to said air treating zone for contacting the concentrated liquid with said circulating air in said zone, and means for controlling the operation of said motor.

6. An apparatus for conditioning air in a room comprising an intake flue, a discharge flue communicating with said intake flue, said flues communicating with the atmosphere outside said room, a fan for circulating air through said flues, a motor for operating said fan, a pump operated by said motor for circulating a hygroscopic liquid through said discharge flue, means in said discharge flue for imparting to said liquid a predetermined degree of concentration at substantially atmospheric temperature, said latter means comprising a steam conduit, a valve for controlling the amount of steam passing through said conduit and an air cooled condenser, an air treating zone for the air in the room, a fan actuated by said motor for circulating the air in said room through said zone, a pump actuated by said motor for delivering the liquid to said air treating zone for contacting the concentrated liquid with said circulating air in said zone, and means for controlling the operation of the motor, said latter means also controlling said valve.

7. A portable apparatus for conditioning air in a room comprising an intake flue, a discharge flue communicating with said intake flue, said apparatus being adapted to be placed adjacent an opening in the room leading to the outside atmosphere with said intake and discharge flues communicating with the outside atmosphere, means for circulating a hygroscopic liquid through said discharge flue, means in said discharge flue for imparting to said liquid a predetermined degree of concentration at substantially atmospheric temperature, an air treating zone for the air in the room, means for circulating the air in said room through said zone and means for contacting the concentrated liquid with said circulating air in said treating zone.

8. An apparatus for conditioning air in a room, said apparatus being located in said room and having air intake and air discharge connections in the room, means for conditioning the air passing through said connections, air intake and air discharge connections in a window of said room, and means for contacting air passing through said last named connections with said means for conditioning the air.

9. An apparatus for conditioning air in an enclosure comprising means for contacting a first stream of air for said enclosure with a circulated liquid hygroscopic medium, means for heating said liquid hygroscopic medium after contact with said first stream, means for flowing said liquid hygroscopic medium gravitationally while in a heated condition, means causing a second stream of air to flow in an opposite direction in contact with said liquid hygroscopic medium while said medium is flowing gravitationally in a heated condition to concentrate said medium for reuse, said last named means including a thermal exchange device acting between said second stream of air and said heated medium after said medium has been heated, thereby to cool said medium.

10. An apparatus for conditioning air in an enclosure which comprises means for contacting a first stream of air for said enclosure with a circulated solution of a lithium salt having the water vapor characteristics of the soluble lithium halides, means for heating said solution after contact with said first stream, means for flowing said solution while in a heated condition in contact with a second stream of air to concentrate said solution for reuse, said last named means including a thermal exchange device acting between said second stream of air and said heated medium after said medium has been heated, thereby to cool said medium.

11. An apparatus for conditioning air for an enclosure which comprises means for contacting a first stream of air for said enclosure with a circulated solution of a lithium salt having the water vapor characteristics of the soluble lithium halides, means for heating said solution after contact with said first stream, means for automatically controlling the heating of said solution, means for flowing said solution while in a heated condition with a second stream of air to concentrate said solution for reuse, said last named means including a thermal exchange device acting between said second stream of air and said heated medium after said medium has been heated, thereby to cool said medium.

12. An apparatus for conditioning air for an enclosure which comprises means for contacting a first stream of air for said enclosure with a circulated liquid hygroscopic medium, means for heating said liquid hygroscopic medium after contact with said first stream, means automatically controlling the heating of said medium to a predetermined temperature, means for flowing said medium while in a heated condition in contact with a second stream of air to concentrate said medium for reuse.

13. An apparatus for conditioning air for an enclosure which comprises means for contacting a first stream of air for said enclosure with a circulated solution of a lithium compound having the water vapor characteristics of the soluble lithium halides, means for heating said solution after contact with said first stream, means automatically controlling the heating of said solution to a predetermined temperature, means for flowing said solution gravitationally while in a heated condition in contact with an oppositely flowing second stream of air to concentrate said solution for reuse.

14. An apparatus for conditioning air in a room having a window, comprising a portable cabinet separate from the walls of said room and movable into and out of said room, said cabinet to be placed in said room and having an air conditioning compartment, means forcibly circulating air through said compartment and into said room, means for removing moisture from air circulated through said compartment, a conduit extending to said window from said cabinet and means in said conduit for separating the removed moisture from said last named means, and means for discharging said moisture outside said room through said window.

15. An apparatus for conditioning air in a room having a window, comprising a portable cabinet separate from the walls of said room and movable into and out of said room, said cabinet to be placed in said room and having a first compartment and a second compartment, means forcibly circulating air through said first compartment into said room, means for removing moisture from air circulated through said first compartment by a circulated medium, means for circulating said medium from said first compartment to said second compartment, means in said second compartment for restoring said medium to its original condition to render it capable again of removing moisture, and conduit means extending to said window for discharging said removed moisture outside said room.

16. An apparatus for conditioning air in a room having a window, comprising a portable cabinet separate from the walls of said room and movable into and out of said room, said cabinet to be placed in said room and having a first compartment and a second compartment, means for forcibly circulating a first stream of air through said first compartment into said room, means for removing moisture from said first stream of air circulated through said first compartment by a circulated medium, means for circulating said medium from said first compartment to said second compartment, means in said second compartment for restoring said medium to its original condition to render it capable again of removing moisture, means for circulating a second stream of air to and from the exterior of said room through said window and through said second compartment to aid in restoring said medium and to discharge the removed moisture to the exterior of said room through said window.

17. An apparatus for conditioning air in a room having a window, comprising a portable cabinet separate from the walls of said room and movable into and out of said room, said cabinet to be placed in said room and having an air conditioning compartment, means forcibly circulating air through said compartment and into said room, means for removing moisture from air circulated through said compartment, and a conduit extending to said window from said cabinet, said conduit receiving the removed moisture and discharging said moisture outside said room through said window.

HARRY F. SMITH.